United States Patent
Seol et al.

(10) Patent No.: US 9,046,737 B2
(45) Date of Patent: Jun. 2, 2015

(54) DRIVING APPARATUS FOR CAMERA LENS ASSEMBLY

(71) Applicant: Jahwa Electronics Co., LTD., Chungcheongbuk-do (KR)

(72) Inventors: Jin-Soo Seol, Chungcheongbuk-do (KR); Jun-Suk Jang, Seoul (KR); Jong-Pil Lee, Chungcheongbuk-do (KR)

(73) Assignee: Jahwa Electronics Co., Ltd., Cheongju, Chungcheongbuk-Do (KR)

( * ) Notice: Subject to any disclaimer, the term of this patent is extended or adjusted under 35 U.S.C. 154(b) by 0 days.

(21) Appl. No.: 14/368,096

(22) PCT Filed: Dec. 18, 2012

(86) PCT No.: PCT/KR2012/011068
§ 371 (c)(1),
(2) Date: Jun. 23, 2014

(87) PCT Pub. No.: WO2013/094963
PCT Pub. Date: Jun. 27, 2013

(65) Prior Publication Data
US 2014/0368937 A1    Dec. 18, 2014

(30) Foreign Application Priority Data

Dec. 21, 2011    (KR) .................. 10-2011-0139290

(51) Int. Cl.
*G02B 7/08* (2006.01)
*G03B 3/10* (2006.01)
*G02B 7/04* (2006.01)

(52) U.S. Cl.
CPC .. *G03B 3/10* (2013.01); *G02B 7/08* (2013.01); *G03B 2205/0069* (2013.01); *G02B 7/04* (2013.01)

(58) Field of Classification Search
CPC .............. G02B 7/04; G02B 7/08; G03B 3/10; G03B 2205/0069
USPC .......................... 359/824; 396/133; 348/374
See application file for complete search history.

(56) References Cited

U.S. PATENT DOCUMENTS

| 2010/0053784 A1 | 3/2010 | Kang et al. | |
| 2010/0182490 A1* | 7/2010 | Seol et al. | 348/345 |

(Continued)

FOREIGN PATENT DOCUMENTS

| KR | 10-1041473 B1 | 6/2011 |
| KR | 101041473 | 6/2011 |

(Continued)

OTHER PUBLICATIONS

Office Action from Korean Intellectual Property Office for Korean Application No. 10-2011-0139290, mailed Dec. 18, 2012, 5 pages.

(Continued)

*Primary Examiner* — William Choi
(74) *Attorney, Agent, or Firm* — Mintz Levin Cohn Ferris Glovsky and Popeo, P.C.; Kongsik Kim

(57) ABSTRACT

Provided is a driving apparatus for a camera lens assembly, the driving apparatus including a lens assembly portion which includes a magnetic object and a support member, a driving base portion which includes a coil portion for generating a driving force to correspond to the magnetic object, and a position sensor portion positioned in the driving base portion eccentrically to a side from a center of the magnetic object.

15 Claims, 5 Drawing Sheets

(56) References Cited

U.S. PATENT DOCUMENTS

| | | |
|---|---|---|
| 2011/0019075 A1 | 1/2011 | Chiang et al. |
| 2011/0235196 A1 | 9/2011 | Ke et al. |
| 2011/0236008 A1 | 9/2011 | Kang et al. |

FOREIGN PATENT DOCUMENTS

| | | |
|---|---|---|
| KR | 10-2011-0080283 A | 7/2011 |
| KR | 20-2011-0008714 U | 9/2011 |
| KR | 10-1285412 B1 | 7/2013 |

OTHER PUBLICATIONS

PCT/ISA/220, Search Report issued on PCT/KR2012/011068, (pp. 3).

PCT/ISA/220, Written Opinion issued on PCT/KR2012/011068, (pp. 5).

* cited by examiner

Fig. 1    *Prior Art*
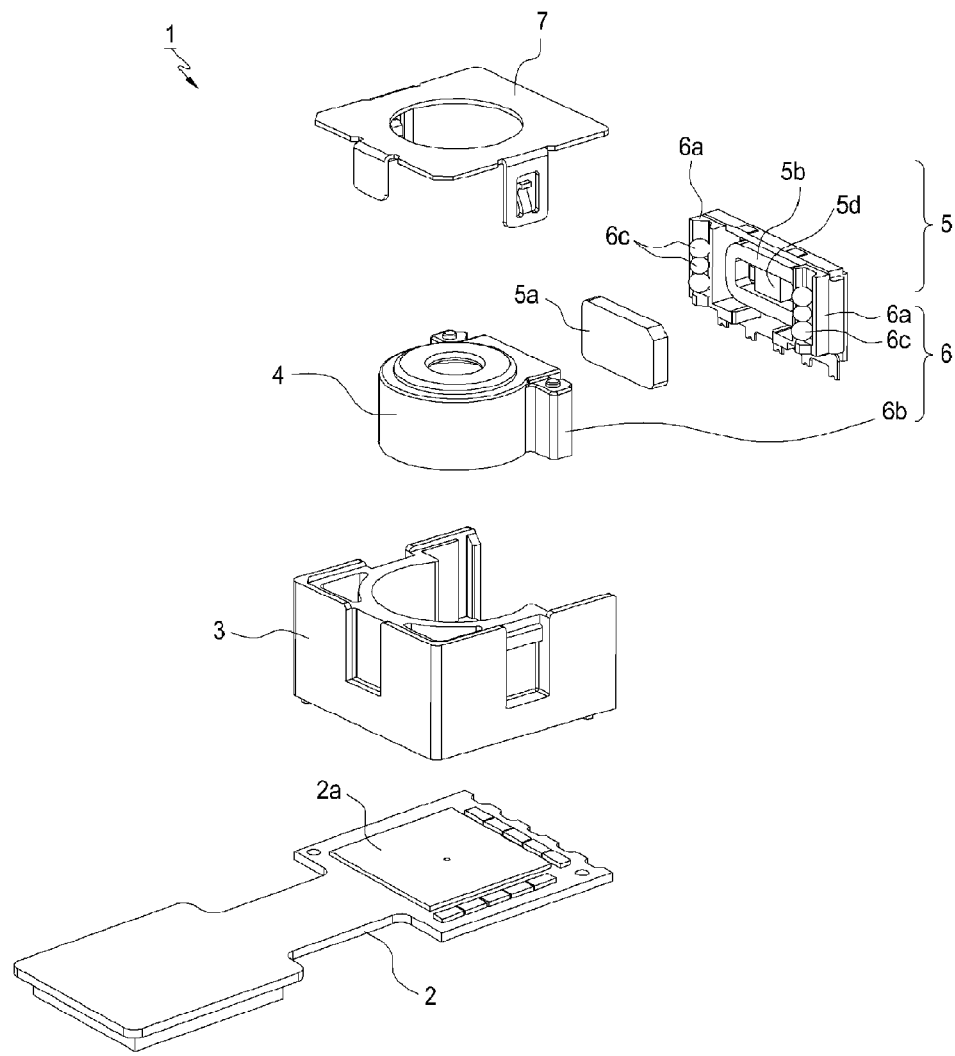
Fig. 2    *Prior Art*
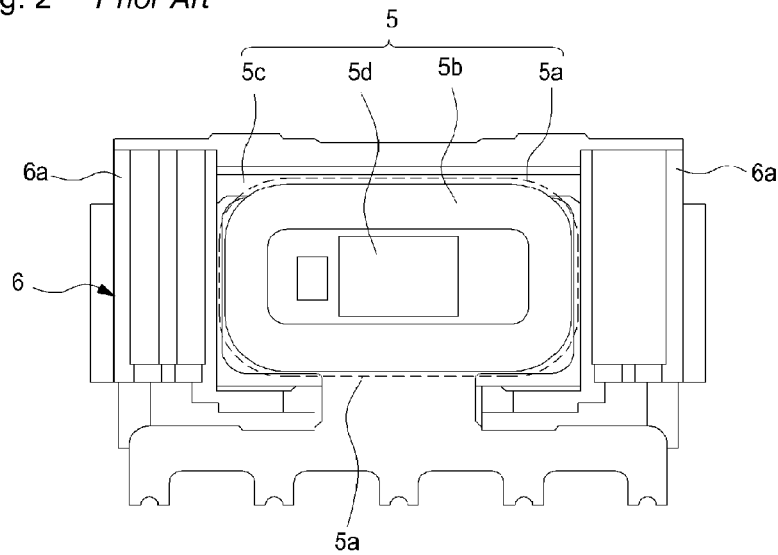

DRIVING APPARATUS FOR CAMERA LENS ASSEMBLY

TECHNICAL FIELD

The present invention relates to a driving apparatus for a camera lens assembly, and more particularly, to a driving apparatus for a camera lens assembly, in which a position sensor portion is configured eccentrically from a center of a magnetic object.

BACKGROUND ART

With the development of digital camera manufacturing technologies, small-size and lightweight camera lens assemblies have emerged, which allow cameras to be mounted on portable communication devices, such that portable communication devices having optical lenses and camera lens assemblies mounted thereon have come into wide use.

The camera lens assembly has been miniaturized to be mounted on a portable communication device, and the miniaturized camera lens assembly should be structured to properly realize performance. Together with magnification, another key factor for defining performance of the camera lens assembly is resolution. As the resolution increases, an object of an object becomes clear, such that even the details of the object can be observed. The camera lens assembly can adjust a focal length between an image sensor and a lens, and the camera lens assembly can show maximal resolution at the optimal focal length.

As shown in FIG. 1, a camera lens assembly 1 is structured as described below. The camera lens assembly 1 includes a printed circuit board 2 including an image sensor 2a, a main frame 3, a lens assembly 4, which is provided in the main frame 3 and has a lens (not shown), a driving portion 5 for driving the lens assembly 4 up and down along an optical axis, a guide portion 6 provided between the lens assembly 4 and the driving portion 5, and a cover portion 7 provided on the lens assembly 4.

As shown in FIGS. 1 and 2, the driving portion 5 includes a magnetic object 5a disposed on the lens assembly 4, a coil 5b which is disposed on the main frame 3 in such a way to face the magnetic object 5a and is provided on the center of the magnetic object 5a, a yoke 5c which is fixed on the main frame 3 and is disposed with the coil 5b placed therebetween in such a way to face the magnetic object 5a, and a position sensor 5d which is provided in the yoke 5c and the coil 5b to detect a position of the magnetic object 5a. The driving portion 5 stops the lens assembly 4 at a preset position by an attractive force between the magnetic object 5a and the yoke 5c when power is not supplied to the coil 5b, and generates an electric field and drives the lens assembly 4 through interaction between the electric field and a magnetic field of the magnetic object 5a when the power is supplied to the coil 5b. The position sensor 5d includes a hall sensor for sensing a position change of the magnetic object 5a.

As shown in FIG. 1, the guide portion 6 includes a pair of guide members 6a provided in the driving portion 5, a pair of support members 6b provided in the lens assembly 4 to correspond to the guide members 6a, and a plurality of balls 6c provided between the guide members 6a and the support members 6b. The support members 6b are disposed to face the guide members 6a, and maintain spaced apart from the guide members 6a by the balls 6c.

A related structure of the camera lens assembly is disclosed in Korean Patent Registration No. 10-1041473 (registered on Jun. 8, 2011).

However, in the driving portion of the conventional camera lens assembly, when the power is not supplied to the coil, the center of the magnetic object and the center of the coil coincide with each other due to an influence of the attractive force between the magnetic object and the yoke. In this case, the position sensor provided in the coil cannot detect an accurate focal length position in initial driving due to the influence of the attractive force, and if the current is supplied to the coil when the center of the magnetic object and the center of the coil coincide with each other, the position sensor disposed on the center of the coil cannot detect an accurate focal length position in initial driving due to an influence of the electric field induced by the coil, resulting in degradation of an initial resolution of the camera lens assembly.

Moreover, the position sensor may malfunction due to the influence of the electric field of the coil.

Therefore, there is a need for an apparatus for disposing the position sensor and the coil eccentrically from the center of the magnetic object such that they can escape from the influence of the attractive force between the magnetic object and the yoke and the influence of the electric field generated in the coil.

DISCLOSURE OF INVENTION

Technical Problem

Accordingly, the present invention provides a driving apparatus for a camera lens assembly, in which a position sensor portion is configured eccentrically from a center of a magnetic object, thereby minimizing an influence of an attractive force between the magnetic object and a yoke portion and an influence of an electric field generated in a coil portion upon the position sensor portion, such that an accurate focal length position can be detected in initial driving of a product, and thus a initial resolution of a camera lens assembly and a function of a product can be improved and malfunctioning of the position sensor portion can be prevented.

The present invention also provides a driving apparatus for a camera lens assembly, in which a coil portion is configured eccentrically from a center of a magnetic object, thereby minimizing an influence of an electric field generated in the coil portion upon a position sensor portion and thus further preventing malfunctioning of the position sensor portion.

The present invention also provides a driving apparatus for a camera lens assembly, in which at least one stopper portions formed to the same height or different heights to restrict driving of a lens assembly portion are configured at positions adjacent to a position sensor portion and a coil portion, thereby improving a driving force of the lens assembly portion.

The present invention also provides a driving apparatus for a camera lens assembly, in which a stopper portion for restricting driving of a lens assembly portion is configured in a coil portion disposed eccentrically from a center of a magnetic object, thereby preventing torsion of the lens assembly portion and thus improving a driving force and an operability of the lens assembly portion.

Solution to Problem

According to an aspect of the present invention, there is provided a driving apparatus for a camera lens assembly, the driving apparatus including a lens assembly portion which includes a magnetic object and a support member, a driving base portion which includes a coil portion for generating a driving force to correspond to the magnetic object, and a position sensor portion positioned in the driving base portion eccentrically to a side from a center of the magnetic object.

According to another aspect of the present invention, there is provided a driving apparatus for a camera lens assembly, the driving apparatus including a lens assembly portion which includes a magnetic object and a support member, a driving base portion which includes a coil portion for generating a driving force to correspond to the magnetic object and a guide portion for guiding driving of the lens assembly portion, and a position sensor portion positioned between the guide portion and the coil portion to be provided in the driving base portion eccentrically from a center of the magnetic object.

According to another aspect of the present invention, there is provided a driving apparatus for a camera lens assembly, the driving apparatus including a lens assembly portion which includes a magnetic object and a support member, a driving base portion which includes a coil portion for generating a driving force to correspond to the magnetic object and a guide portion for guiding driving of the lens assembly portion, a position sensor portion positioned between the guide portion and the coil portion to be provided in the driving base portion eccentrically from a center of the magnetic object, and a first stopper portion and a second stopper portion provided in the driving base portion and positioned in adjacent to the position sensor portion or the coil portion to restrict driving of the lens assembly portion.

According to another aspect of the present invention, there is provided a driving apparatus for a camera lens assembly, the driving apparatus including a lens assembly portion which includes a magnetic object and a support member, a driving base portion which includes a coil portion for generating a driving force to correspond to the magnetic object and a guide portion for guiding driving of the lens assembly portion, a position sensor portion positioned between the guide portion and the coil portion to be provided in the driving base portion eccentrically from a center of the magnetic object, and at least one stopper portions provided in the driving base portion and positioned in adjacent to the coil portion to restrict driving of the lens assembly portion.

Advantageous Effects of Invention the present invention provides a driving apparatus for a camera lens assembly, in which a position sensor portion is configured eccentrically from a center of a magnetic object, thereby minimizing an influence of an attractive force between the magnetic object and a yoke portion and an influence of an electric field generated in a coil portion upon the position sensor portion, such that an accurate focal length position can be detected in initial driving of a product, and thus a initial resolution of a camera lens assembly and a function of a product can be improved and malfunctioning of the position sensor portion can be prevented.

The present invention also provides a driving apparatus for a camera lens assembly, in which a coil portion is configured eccentrically from a center of a magnetic object, thereby minimizing an influence of an electric field generated in the coil portion upon a position sensor portion and thus further preventing malfunctioning of the position sensor portion.

The present invention also provides a driving apparatus for a camera lens assembly, in which at least one stopper portions formed to the same height or different heights to restrict driving of a lens assembly portion are configured at positions adjacent to a position sensor portion and a coil portion, thereby improving a driving force of the lens assembly portion.

The present invention also provides a driving apparatus for a camera lens assembly, in which a stopper portion for restricting driving of a lens assembly portion is configured in a coil portion disposed eccentrically from a center of a magnetic object, thereby preventing torsion of the lens assembly portion and thus improving a driving force and an operability of the lens assembly portion.

BRIEF DESCRIPTION OF DRAWINGS

FIG. 1 is an exploded perspective view showing a conventional camera lens assembly;

FIG. 2 is a front view showing a driving portion of a conventional camera lens assembly;

BEST MODE FOR CARRYING OUT THE INVENTION

Hereinafter, exemplary embodiments of the present invention will be described in detail with reference to the accompanying drawings. Well-known functions and constructions will not be provided if they unnecessarily obscure the subject matter of the present invention.

Figure 3:
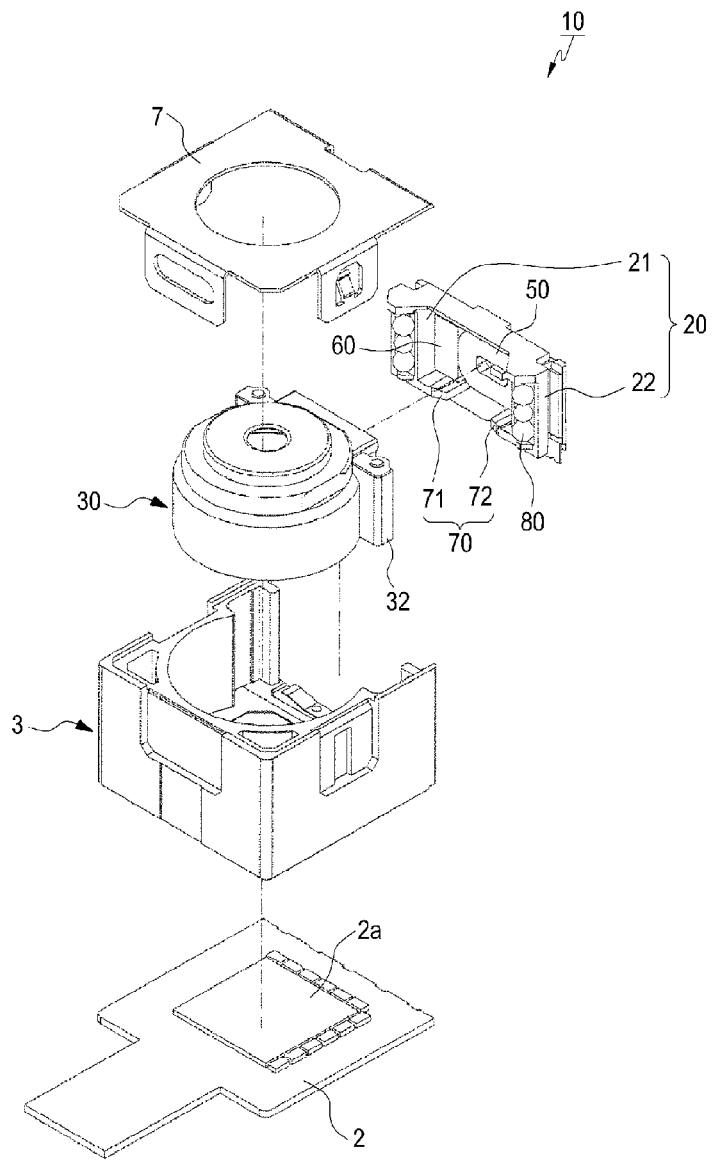
FIG. 3 is an exploded perspective view showing a driving apparatus for a camera lens assembly according to an embodiment of the present invention.

FIG. 3 is an exploded perspective view showing a driving apparatus for a camera lens assembly according to an embodiment of the present invention.

Referring to FIG. 3, a driving apparatus 10 for the camera lens assembly will be described. The driving apparatus 10 for the camera lens assembly may include a driving base portion 20, a lens assembly portion 30 including a magnetic object 31 and a support member 32, a yoke portion 40, a coil portion 50, and a position sensor portion 60. The driving base portion 20 includes a guide portion to guide driving of the lens assembly portion 30. The driving base portion 20 includes the guide portion including first and second members 21 and 22, the yoke portion 40, the coil portion 50, and the position sensor portion 60. The lens assembly portion 30 includes a lens (not shown) and is coupled to a main frame 3, and the lens assembly portion 30 is coupled with the driving base portion 20 and the magnetic object 31 corresponds to the coil portion 50 and the position sensor portion 60. The support member 32 is coupled to correspond to the first and second guide members 21 and 22. The yoke portion 40 couples the coil portion 50 with the position sensor portion 60 and is provided in the driving base portion 20. The position sensor portion 60 is provided in the yoke portion 40 to be eccentric to a side from a center A1 of the magnetic object 31.

Herein, the coil portion 50 is provided in the yoke portion 40 to correspond to the magnetic object 31, generate a driving force, and be provided eccentrically to a side from the center A1 of the magnetic object 31.

Moreover, the position sensor portion 60 and the coil portion 50 are located in adjacent to any one of the first and second guide members 21 and 22.

The first and second guide members 21 and 22 preferably include a "V" groove or a "U" groove. The position sensor portion 60 is preferably disposed in adjacent to the "V" groove.

The first guide member 21 includes a groove formed of at least two surfaces with different inner circumferential surfaces, which are adjacent to one another, and preferably, the first guide member 21 includes a groove in a different shape than the groove formed of at least two surfaces with different inner circumferences, which are adjacent to one another. The second guide member 22 includes a groove whose inner circumferential surface has a curved or right-angle surface, and preferably, the second guide member 22 includes a groove in a different shape than the groove whose inner circumferential surface has a curved or right-angle surface, such as a groove in a "⌐" shape or a "⌐" shape.

The first guide member 21 is preferably formed as a "V" groove. The first guide member 21 may also be formed in a different shape than a "V" groove or a "U" groove, such as a "C" groove or a "W" groove. The second guide member 21 is preferably formed as a "U" groove. The second guide member 21 may also be formed in a different shape than a "U" groove, such as a "C" groove or a "W" groove.

Figure 7:
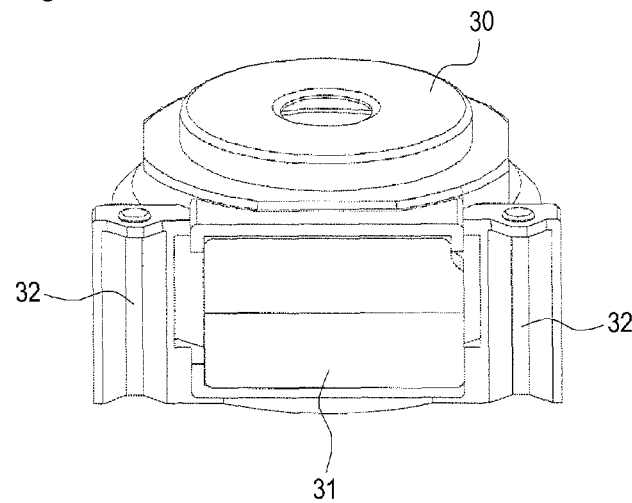
FIG. 7 is a perspective view showing a lens assembly portion of a driving apparatus for a camera lens assembly according to an embodiment of the present invention.

As shown in FIG. 7, a center C1 of the coil portion 50 is provided in the same direction as the center A1 of the magnetic object 31, and preferably has a predetermined distance D1 eccentrically from the center A1 of the magnetic object 31.

Figure 8:
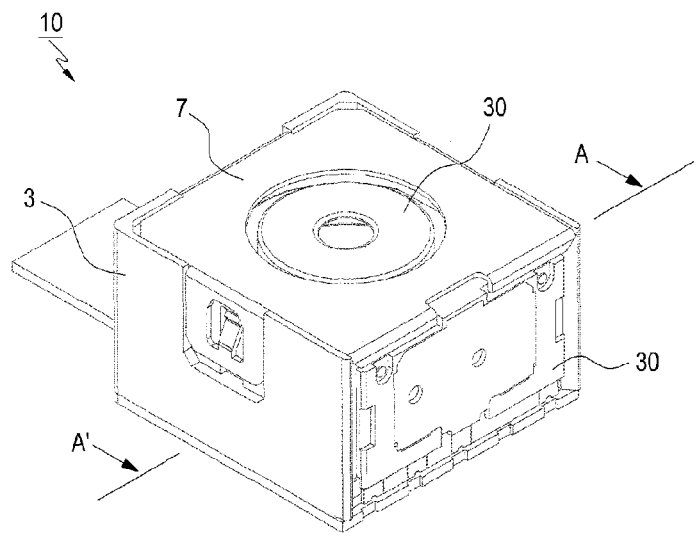
FIG. 8 is a perspective view showing a coupled state of a camera lens assembly according to an embodiment of the present invention.
Figure 9:
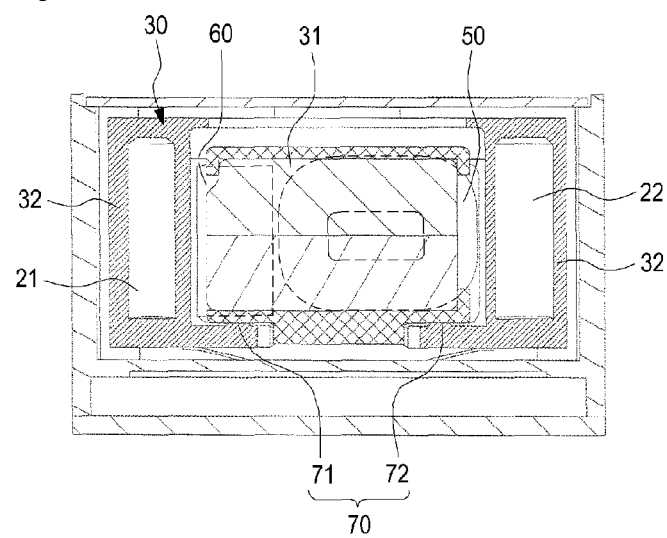
FIG. 9 is a cross-sectional view taken along a line A A' of FIG. 8.

As shown in FIGS. 8 and 9, the driving base portion 20 includes a pair of stopper portions 70 to restrict a driving section of the lens assembly portion 30.

The stopper portions 70 include a first stopper portion 71 and a second stopper portion 72. The first stopper portion 71 is provided under the position sensor portion 60 to restrict driving of the lens assembly portion 30, and the second stopper portion 72 is provided under the coil portion 50 to restrict driving of the lens assembly portion 30 like the first stopper portion 71.

As shown in FIG. 9, the first stopper portion 71 and the second stopper portion 72 protrude to the same height to prevent torsion of the lens assembly portion 30. That is, if power is not supplied to the coil portion 50, the center A1 of the magnetic object 31 tends to move in a direction aligned with the center C1 of the coil portion 50 provided in the yoke portion 40 and positioned eccentrically. This phenomenon occurs due to an attractive force between the magnetic object 31 and the coil portion 50 provided I the yoke portion 40. That is, the center A1 of the magnetic object 31 moves towards the center A1 of the coil portion 50 positioned eccentrically and at the same time, torsion of the lens assembly portion 30 including the magnetic object 31 occurs. Therefore, the first stopper portion 71 and the second stopper portion 72 protruding to the same height can prevent torsion of the lens assembly portion 30.

Figure 10:
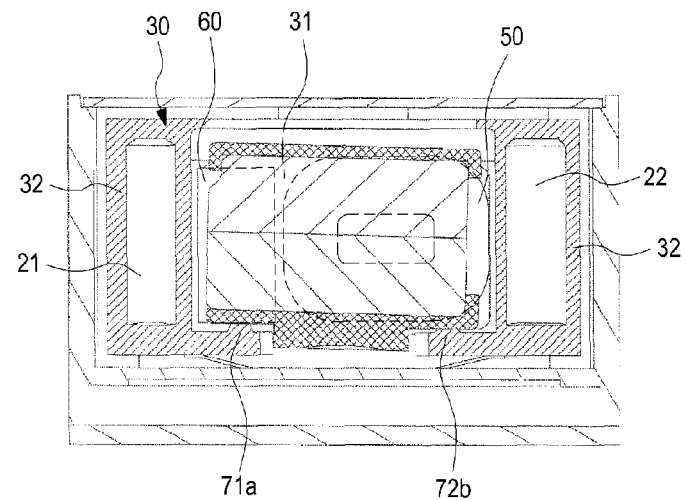
FIG. 10 is a view showing another embodiment of stopper portions of a camera lens assembly according to an embodiment of the present invention, in which an operation state is shown when a first stopper portion is higher than a second stopper portion.
Figure 11:
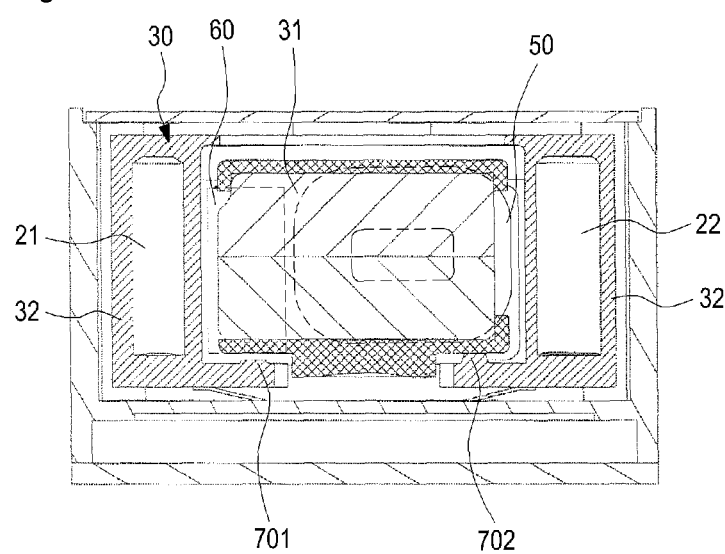
FIG. 11 is a view showing still another embodiment of stopper portions of a camera lens assembly according to an embodiment of the present invention, in which an operation state is shown when a second stopper portion is higher than a first stopper portion.

FIGS. 10 and 11 show other embodiments of the first and second stopper portions 21 and 22.

Referring to FIGS. 10 and 11, as shown in FIG. 11, a second stopper portion 702 is formed to protrude higher than a first stopper portion 701, thereby further preventing torsion of the lens assembly portion 30 in driving of the lens assembly portion 30. Herein, as shown in FIG. 10, if a second stopper portion 72b is formed to protrude lower than a first stopper portion 71a, then torsion of the lens assembly portion 30 is aggravated. Therefore, it is not preferable that the second stopper portion 72b is formed to protrude lower than the first stopper portion 71a.

The camera lens assembly according to the foregoing embodiments of the present invention is applicable to a portable terminal as a representative application. However, the application of the present invention is not limited to a portable terminal, and the present invention may be applied to terminals in various forms as long as they can include a camera lens assembly.

Examples of the terminals in various forms according to the embodiments of the present invention may include not only mobile communication terminals operating according to communication protocols corresponding to various communication systems, but also any information communication apparatuses and multimedia apparatuses such as Portable Multimedia Players (PMPs), MP3 players, navigation systems, game consoles, notebooks, advertising boards, TVs, digital broadcasting players, Personal Digital Assistants (PDAs), Digital Multimedia Broadcasting (DMB) phones, smart phones, and so forth, and their application apparatuses.

A coupling process for the camera lens assembly will now be described in more detail with reference to FIGS. 4 through 7. First, as shown in FIG. 1, in the yoke portion 40, the coil portion 50 is provided eccentrically to a side from the center A1 of the magnetic object 31 and the position sensor portion 60 is provided eccentrically to a side from the center A1 of the magnetic object 31 outside the coil portion 50. In this state, the yoke portion 40 is coupled to the driving base portion 20, and the driving base portion 20 coupled with the yoke portion 40 is coupled with the lens assembly portion 30 including the magnetic object 31. The magnetic object 31 is coupled with the coil portion 50 and the position sensor portion 60 in such a way to face them, and the coil portion 50 and the position sensor portion 60 face each other in such a way to eccentric from the center A1 of the magnetic object 31. The first guide member 21 and the second guide member 22 of the guide portion face the support member 32 of the lens assembly portion 30, and a plurality of balls 80 are provided between the first and second guide members 21 and 22 and the support member 32. The lens assembly portion 30 and the driving base portion 20 which are coupled to each other are coupled to a main frame 3 which is coupled onto the printed circuit board 2 including the image sensor 2a. In this state, the cover portion 7 is engaged on the main frame 3.

Figure 4:
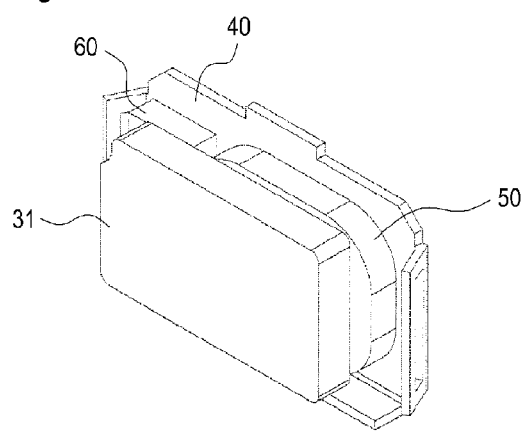
FIG. 4 is a perspective view showing a coupled state of a driving apparatus for a camera lens assembly according to an embodiment of the present invention.

Herein, the structure of the driving base portion 20 will be described in more detail with reference to FIGS. 4 and 5. First, as shown in FIG. 4, the coil portion 50 and the position sensor portion 60 are provided in the yoke portion 40 in such a way to face the magnetic object 31. As shown in FIG. 7 the magnetic object 31 is coupled to the lens assembly portion 30.

Figure 5:
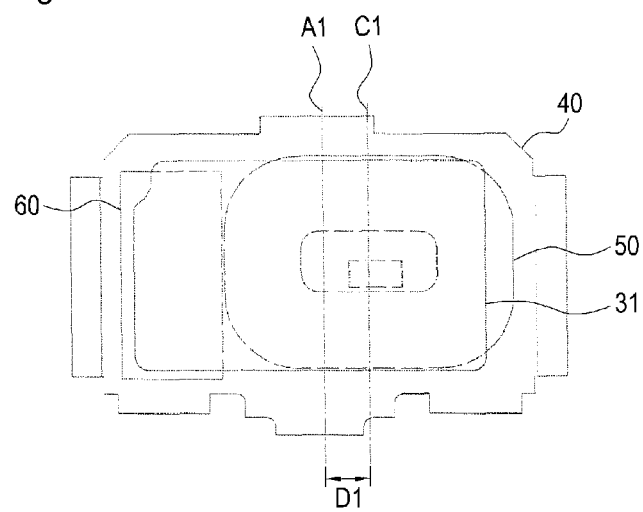
FIG. 5 is a front view showing an operating state of a driving apparatus for a camera lens assembly according to an embodiment of the present invention.

As shown in FIG. 5, the coil portion 50 is provided to have the predetermined distance D1 eccentrically to a side from the center A1 of the magnetic object 31. At the same time, the position sensor portion 60 is provided at a position which is eccentric to a side from the center A1 of the magnetic object 31 outside the coil portion 50.

Figure 6:
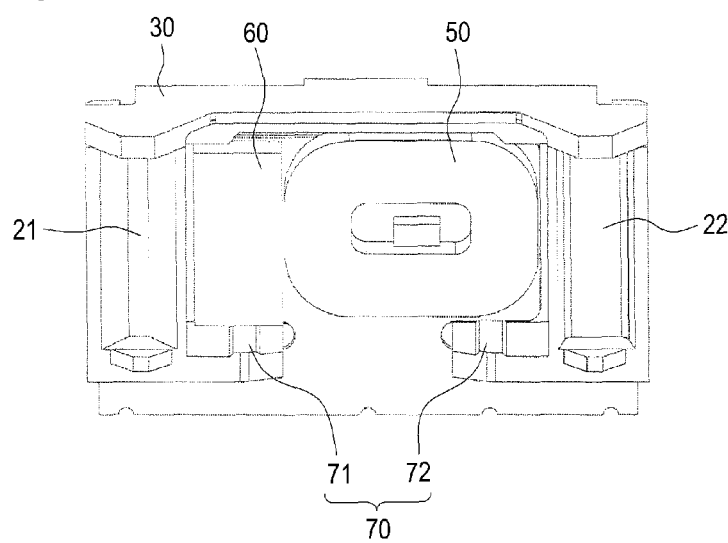
FIG. 6 is a perspective view showing a driving apparatus for a camera lens assembly according to an embodiment of the present invention.

As shown in FIG. 6, the yoke portion 40 which includes the coil portion 50 and the position sensor portion 60 is coupled to the driving base portion 20. The coil portion 50 is positioned in adjacent to the second guide member 22 which is formed as a "U" groove, and the position sensor portion 60 is positioned in adjacent to the first guide member 21 which is formed as a "V" groove. In addition, the driving base portion 20 includes the first stopper portion 71 and the second stopper portion 72 to restrict driving of the lens assembly portion 30, such that the first stopper portion 71 is provided under the position sensor portion 60 and the second stopper portion 72 is provided under the coil portion 50.

An operating process of the camera lens assembly will now be described in more detail with reference to FIGS. 8 and 9. As shown in FIGS. 8 and 9, in an assembly-completed state of the camera lens assembly, if the power is not supplied to the coil portion 50, the magnetic object 31 moves for alignment toward the center C1 of the coil portion 50 provided in the yoke portion 40. Since the coil portion 50 is positioned eccentrically from the center A1 of the magnetic object 31, the magnetic object 31 moves for alignment toward the center C1 of the eccentric coil portion 50. This phenomenon occurs due to the attractive force between the magnetic object 31 and the coil portion 50. Therefore, the lens assembly portion 30 can move both up and down without any interference. In other words, when the power is not applied to the coil portion 50, the center A1 of the magnetic object 31 tends to be aligned with the center C1 of the coil portion 50 which is positioned eccentrically.

The position sensor portion 60 is provided eccentrically to a side form the center A1 of the magnetic object 31, such that the position sensor portion 60 is least affected by the attractive force between the magnetic object 31 and the yoke portion 40. As a result, the initial focal length position of the camera lens assembly can be accurately detected.

That is, a conventional position sensor portion included in a coil portion experiences performance degradation due to an influence of an attractive force between a magnetic object and a yoke portion; however, the position sensor portion 60 according to the present invention is positioned eccentrically with respect to the magnetic object 31 to become more distant from the attractive force, such that the influence of the attractive force upon the position sensor portion 60 is minimized and thus an accurate focal length position can be detected in initial driving of the camera lens assembly, thereby improving the initial resolution of the camera lens assembly and preventing malfunctioning of the position sensor portion 60.

In this state, if the power is supplied to the coil portion 50, the coil portion 50 positioned eccentrically generates an electric field, and by interaction between the electric field generated by the coil portion 50 and a magnetic field of the magnetic object 31, the lens assembly portion 30 is driven both up and down. The electric field generated by the coil portion 50 is generated eccentrically from the center A1 of the magnetic object 31, such that the influence of the electric field of the coil portion 50 upon the position sensor portion 60 can be minimized. Therefore, an accurate focal length position can be detected in initial driving of the camera lens assembly.

That is, a conventional position sensor portion included in a coil portion experiences performance degradation due to an influence of an electric field of the coil portion; however, the position sensor portion 60 according to the present invention is positioned outside the coil portion 50 to become more distant from the electric field of the coil portion 50 positioned eccentrically, such that the influence of the electric field of the coil portion 50 upon the position sensor portion 60 is minimized and thus an accurate focal length position can be detected in initial driving of the camera lens assembly, thereby improving the initial resolution of the camera lens assembly and preventing malfunctioning of the position sensor portion 60.

An operating process of the first and second stopper portions 71 and 72 of the camera lens assembly will now be described in more detail with reference to FIGS. 9 through 11. As shown in FIG. 9, the first stopper portion 71 and the second stopper portion 72 are formed to protrude to the same height on the driving base portion 20 to prevent torsion of the lens assembly portion 30. The first stopper portion 71 is formed to protrude at a position adjacent to the position sensor portion 60, and the second stopper portion 72 is formed to protrude at a position adjacent to the coil portion 50.

In this state, as mentioned previously, if the power is not supplied to the coil portion 50, the center A1 of the magnetic object 31 tends to move toward the center A1 of the coil portion 50 due to the attractive force.

That is, the center A1 of the magnetic object 31 moves toward the center C1 of the coil portion 50 positioned eccentrically, and at the same time, torsion of the lens assembly portion 30 including the magnetic object 31 occurs. Therefore, the first stopper portion 71 and the second stopper portion 72 which protrude to the same height may prevent torsion of the lens assembly portion 30.

FIGS. 10 and 11 show other embodiments of the first and second stopper portions 21 and 22. Referring to FIGS. 10 and 11, as shown in FIG. 11, the second stopper portion 702 is formed to protrude higher than the first stopper portion 701. As shown in FIG. 10, if the second stopper portion 72*b* is formed to protrude lower than the first stopper portion 71*a*, torsion of the magnetic object 31 occurs due to a tendency that the center A1 of the magnetic object 31 moves in a direction aligned with the center C1 of the coil portion 50 positioned eccentrically, such that torsion of the lens assembly portion 30 including the magnetic object 31 is aggravated.

Therefore, as shown in FIG. 11, the second stopper portion 702 is formed higher than the first stopper portion 701, thus preventing torsion of the lens assembly portion 30 and torsion of the optical axis of the lens assembly portion 30, and further improving driving of the lens assembly portion 30.

As can be appreciated from the foregoing description, according to the driving apparatus for the camera lens assembly, the position sensor portion is provided eccentrically from the center of the magnetic object, such that an influence of the attractive force between the magnetic object and the yoke portion upon the position sensor portion and an influence of the electric field of the coil portion upon the position sensor portion can be minimized, and thus an accurate focal length position can be detected in initial driving of a product, thereby improving an initial resolution of the camera lens assembly and the product s function, and preventing malfunctioning of the position sensor portion. Moreover, the coil portion is configured eccentrically from the center of the magnetic object, thereby minimizing the influence of the electric field of the coil portion upon the position sensor portion and thus further preventing malfunctioning of the position sensor portion.

Furthermore, at least one stopper portions formed to the same height or different heights to restrict driving of the lens assembly portion are configured at positions adjacent to the position sensor portion and the coil portion, thereby improving a driving force of the lens assembly portion. In addition, the stopper portion for restricting driving of the lens assembly portion is configured in the coil portion disposed eccentrically from the center of the magnetic object, thereby preventing torsion of the lens assembly portion and thus improving a driving force and an operability of the lens assembly portion.

The driving apparatus for the camera lens assembly according to the present invention is not limited by the foregoing embodiments and the accompanying drawings, and it will be apparent to those of ordinary skill in the art that various substitutions, modifications, and changes can be made within the scope of the present invention.

The invention claimed is:

1. A driving apparatus for a camera lens assembly, the driving apparatus comprising:
a lens assembly portion comprising a magnetic object and a support member;
a driving base portion comprising a coil portion for generating a driving force to correspond to the magnetic object; and
a position sensor portion positioned in the driving base portion eccentrically to a side from a center of the magnetic object.

2. The driving apparatus of claim 1, wherein the coil portion is provided eccentrically to a side from the center of the magnetic object.

3. A driving apparatus for a camera lens assembly, the driving apparatus comprising:
a lens assembly portion comprising a magnetic object and a support member;
a driving base portion comprising a coil portion for generating a driving force to correspond to the magnetic object and a guide portion for guiding driving of the lens assembly portion; and
a position sensor portion positioned between the guide portion and the coil portion to be provided in the driving base portion eccentrically from a center of the magnetic object.

4. The driving apparatus of claim 3, wherein the position sensor portion is positioned in adjacent to one of a first guide member and a second guide member which are included in the guide portion.

5. The driving apparatus of claim 4, wherein the coil portion is positioned in adjacent to one of a first guide member and a second guide member which are included in the guide portion.

6. The driving apparatus of claim 5, wherein the first guide member and the second guide member comprise a "V" groove or a "U" groove.

7. The driving apparatus of claim 6, wherein the position sensor portion is disposed in adjacent to the "V" groove.

8. The driving apparatus of claim 6, wherein the first guide member comprises a groove formed of at least two surfaces with different inner circumferential surfaces, which are adjacent to one another, and the second guide member comprises a groove whose inner circumferential surface has a curved or right-angle surface.

9. The driving apparatus of claim 6, wherein the first guide member comprises a "V" groove and the second guide member comprises a "U" groove.

10. The driving apparatus of claim 3, wherein the driving base portion comprises a pair of stopper portions for restricting a driving section of the lens assembly portion.

11. The driving apparatus of claim 3, wherein the center of the coil portion is provided in the same direction as the center of the magnetic object, and has a predetermined distance from the center of the magnetic object to be eccentric from the center of the magnetic object.

12. A driving apparatus for a camera lens assembly, the driving apparatus comprising:
a lens assembly portion comprising a magnetic object and a support member;
a driving base portion comprising a coil portion for generating a driving force to correspond to the magnetic object and a guide portion for guiding driving of the lens assembly portion;
a position sensor portion positioned between the guide portion and the coil portion to be provided in the driving base portion eccentrically from a center of the magnetic object; and
a first stopper portion and a second stopper portion provided in the driving base portion and positioned in adjacent to the position sensor portion or the coil portion to restrict driving of the lens assembly portion.

13. The driving apparatus of claim 12, wherein the second stopper portion is formed to protrude higher than the first stopper portion.

14. The driving apparatus of claim 12, wherein the second stopper portion is formed to protrude to the same height as the first stopper portion.

15. A driving apparatus for a camera lens assembly, the driving apparatus comprising:
a lens assembly portion comprising a magnetic object and a support member;
a driving base portion comprising a coil portion for generating a driving force to correspond to the magnetic object and a guide portion for guiding driving of the lens assembly portion;
a position sensor portion positioned between the guide portion and the coil portion to be provided in the driving base portion eccentrically from a center of the magnetic object; and
at least one stopper portions provided in the driving base portion and positioned in adjacent to the coil portion to restrict driving of the lens assembly portion.

* * * * *